US012572626B2

(12) United States Patent
Rane et al.

(10) Patent No.: US 12,572,626 B2
(45) Date of Patent: Mar. 10, 2026

(54) METHOD AND SYSTEM FOR OPTIMIZING A PAIR OF AFFINE CLASSIFIERS BASED ON A DIVERSITY METRIC

(71) Applicant: Palo Alto Research Center Incorporated, Palo Alto, CA (US)

(72) Inventors: Shantanu Rane, Palo Alto, CA (US); Bashir Sadeghi, East Lansing, MI (US); Alejandro E. Brito, Mountain View, CA (US)

(73) Assignee: Genesee Valley Innovations, LLC, Santa Clara, CA (US)

( * ) Notice: Subject to any disclaimer, the term of this patent is extended or adjusted under 35 U.S.C. 154(b) by 779 days.

(21) Appl. No.: 17/944,939

(22) Filed: Sep. 14, 2022

(65) Prior Publication Data

US 2024/0086497 A1     Mar. 14, 2024

(51) Int. Cl.
| | |
|---|---|
| *G06F 18/2451* | (2023.01) |
| *G06F 18/2132* | (2023.01) |
| *G06F 18/2137* | (2023.01) |

(52) U.S. Cl.
CPC .... *G06F 18/2451* (2023.01); *G06F 18/21375* (2023.01); *G06F 18/21326* (2023.01)

(58) Field of Classification Search
CPC ........... G06F 18/2451; G06F 18/21375; G06F 18/21326; G06F 18/241
See application file for complete search history.

(56) References Cited

U.S. PATENT DOCUMENTS

2011/0302111 A1     12/2011   Chidlovskii

OTHER PUBLICATIONS

Malkiel MML: Maxima Multiverse Learning for Robust Fine-Tuning of Language Models, pp. 1-11, Nov. 5, 2019.*
Littwin, The Multiverse Loss for Robust Transfer Learning, pp. 1-13, Dec. 15, 2015.*
Ross, Ensembles of Locally Independent Prediction Models, pp. 1-11, Feb. 7, 2020.*
Wang,Feature Selection Kernel Class Separability, pp. 1534-1546, Sep. 2008.*
Elen, An Adaptive Gaussian Kernel for Support Vector Machine, pp. 10579-10588, Mar. 5, 2022.*
Madry, Towards Deep Learning Models Resistant to Adversarial Attacks, pp. 1-28, Sep. 4, 2019.*
(Continued)

*Primary Examiner* — Albert M Phillips, III
(74) *Attorney, Agent, or Firm* — Yao Legal Services, Inc.; Shun Yao

(57) ABSTRACT

One embodiment provides a method and system which facilitates optimizing a pair of affine classifiers based on a diversity metric. During operation, the system defines a diversity metric based on an angle between decision boundaries of a pair of affine classifiers. The system includes the diversity metric as a regularization term in a loss function optimization for designing the pair of affine classifiers, wherein the designed pair of affine classifiers are mutually orthogonal. The system predicts an outcome for a testing data object based on the designed pair of mutually orthogonal affine classifiers.

20 Claims, 6 Drawing Sheets
(2 of 6 Drawing Sheet(s) Filed in Color)

(56)           References Cited

OTHER PUBLICATIONS

Tsoumakas, Grigorios, Ioannis Katakis, and Ioannis Vlahavas. "Effective and efficient multilabel classification in domains with large number of labels." Proc. ECML/PKDD 2008 Workshop on Mining Multidimensional Data (MMD'08). vol. 21. 2008. (Year: 2008).
Similarity-based Multi-label Learning taken from https://arxiv.org/pdf/1710.10335v1 .pdf (Year: 2017).
Ml-knn: A Lazy Learning Approach toMulti-Label Learning taken from http://citeseerx.ist.psu.edu/viewdoc/download?doi= 10.1.1.89.7148&rep=rep1&type=pdf (Year: 2007).
Score Normalization and Aggregation for Active Learning in Multi-label Classification taken from https://www.researchgate.net/publication/222089355_Score_Normalization_and_Aggregation_for_Active_Learningjn_Multi-label_Classification (Year: 2010).
ML-CLUBAS: A Multi Label Bug Classification Algorithm taken from https://file.scirp.org/Html/2-9301529_26203.htm (Year: 2012).
A Fuzzy Similarity-Based Approach for Multi-label Document Classification taken from https://www.researchgate.net/publication/232625068_A_Fuzzy_Similarity-Based_Approach_for_Multi-labelDocument_Classification (Year: 2009).
Madhieh Abbasi et al. "Robustness to Adversarial Examples Through and Ensemble of Specialists" Computer Vision and Systems Laboratory, Electrical and Computer Engineering Department Universite Laval, Quebec, Canada, Mar. 10, 2017.
Naveed Akhtar et al. "Threat of Adversarial Attacks on Deep Learning in Computer Vision: A Survey", School of Computer Science and Software Engineering, University of Western Australia, Feb. 26, 2018.
Maria-Florina Balcan et al. "Agnostic Active Learning", Jun. 13, 2008.
Alexander Bagnall et al. "Training Ensembles to Detect Adversarial Examples", Dec. 11, 2017.
Battista Biggio et al. "Wild Patterns: Ten Years After the Rise of Adversarial Machine Learning", Jul. 19, 2018.
Anirban Chakraborty et al. "Adversarial Attacks and Defences: A Survey", Sep. 28, 2018.
Nicholas Carlini et al. "Towards Evaluating the Robustness of Neural Networks", Mar. 22, 2017.
Yoav Freund et al. "Selective Sampling Using the Query by Committee Algorithm", Machine Learning, 28, 133-168 (1997), 1997 Kluwer Academic Publishers.
Ian J. Goodfellow et al. "Explaining and Harnessing Adversarial Examples", Mar. 20, 2015.
Steve Hanneke "Rates of Convergence in Active Learning", The Annals of Statistics, 2011, vol. 39, No. 1, 333-361, nstitute of Mathematical Statistics, 2011.
Haym Hirsh "Theoretical Underpinnings of Version Spaces", Computer Science Department Rutgers University, tew Brunswick, NJ.
Ralf Herbrich et al. "Bayes Point Machines", 2001.

Kebana "Robust Arrangements of Classifiers in Version Space".
Qiang Liu "A Survey on Security Threats and Defensive Techniques of Machine Learning: A Data Driven View", IEEE Feb. 2018.
Yu Li "On the Decision Boundary of Deep Neural Networks", Jan. 1, 2019.
Tessa Lau "Programming by Demonstration Using Version Space Algebra", Machine Learning, 53,111-156, 2003.
Tom M. Mitchell "Generalization as Search", Computer Science Department, Rutgers University.
Seyed-Mohsen Moosavi-Dezfooli "DeepFool: a simple and accurate method to fool deep neural networks" Jul. 4, 2016.
Aamir Mustafa "Adversarial Defense by Restricting the Hidden Space of Deep Neural Networks" Jul. 28, 2019.
Nicolas Papernot "Distillation as a Defense to Adversarial Perturbations against Deep Neural Networks" IEEE 2016, Mar. 14, 2016.
Shantanu Rane"A Version Space Perspective on Differentially Private Pool-Based Active Learning", Downloaded \Aug. 28, 2020.
Daniel Soudry "The Implicit Bias of Gradient Descent on Separable Data", Journal of Machine Learning Research 19(2018), Dec. 28, 2018.
Uiawei Su "One Pixel Attach for Fooling Deep Neural Networks" Oct. 17, 2019.
Yichuan Tang "Deep Learning using Linear Support Vector Machines", Feb. 21, 2015.
Simon Tong "Support Vector Machine Active Learning with Applications to Text Classification", Journal of Machine .Learning Research (2001).
Florian Tramer "Ensemble Adversarial Training: Attacks and Defenses" ICLR 2018, Apr. 26, 2020.
Yan Zhou "Breaking Transferability of Adversarial Samples with Randomness", Jun. 17, 2018.
Korean Office Action issued in corresponding KR Application No. 30-2024-0031811, dated Feb. 19, 2025, 3 pages.
Korean Office Action issued in corresponding KR Application No. 30-2024-0031812, dated Feb. 19, 2025, 3 pages.
Korean Office Action issued in corresponding KR Application No. 30-2024-0031813, dated Feb. 19, 2025, 3 pages.
Korean Office Action issued in corresponding KR Application No. 30-2024-0031814, dated Feb. 19, 2025, 3 pages.
Samsung Display Newsroom, "'MWC 2024' 삼성디스플레이 부스에 전시된 OLED 를 적용한 스마트 스피커 (Smart Speaker)," located at https://news.samsungdisplay.com/medialibrary/photo/333?albumNum=74&page=3, published Feb. 26, 2024, 4 pages.
YouTube, Inc., Samsung Display, "[MWC 2024] 부드럽게 펼쳐지는 스마트한 스피커· 삼성디스플레이의 OLED Smart Speaker!," located at https://www.youtube.com/watch?v=-6d-ZT0miFk&t=1s, published Feb. 27, 2024, 1 page.
Samsung Display Newsroom, "MWC 2024 삼성디스플레이 전시관 둘아보기! MWC 를 물들인 삼성의 독보적인 'OLED Vibes'," located at https://news.samsungdisplay.com/34167, published Feb. 27, 2024, 7 pages.

\* cited by examiner

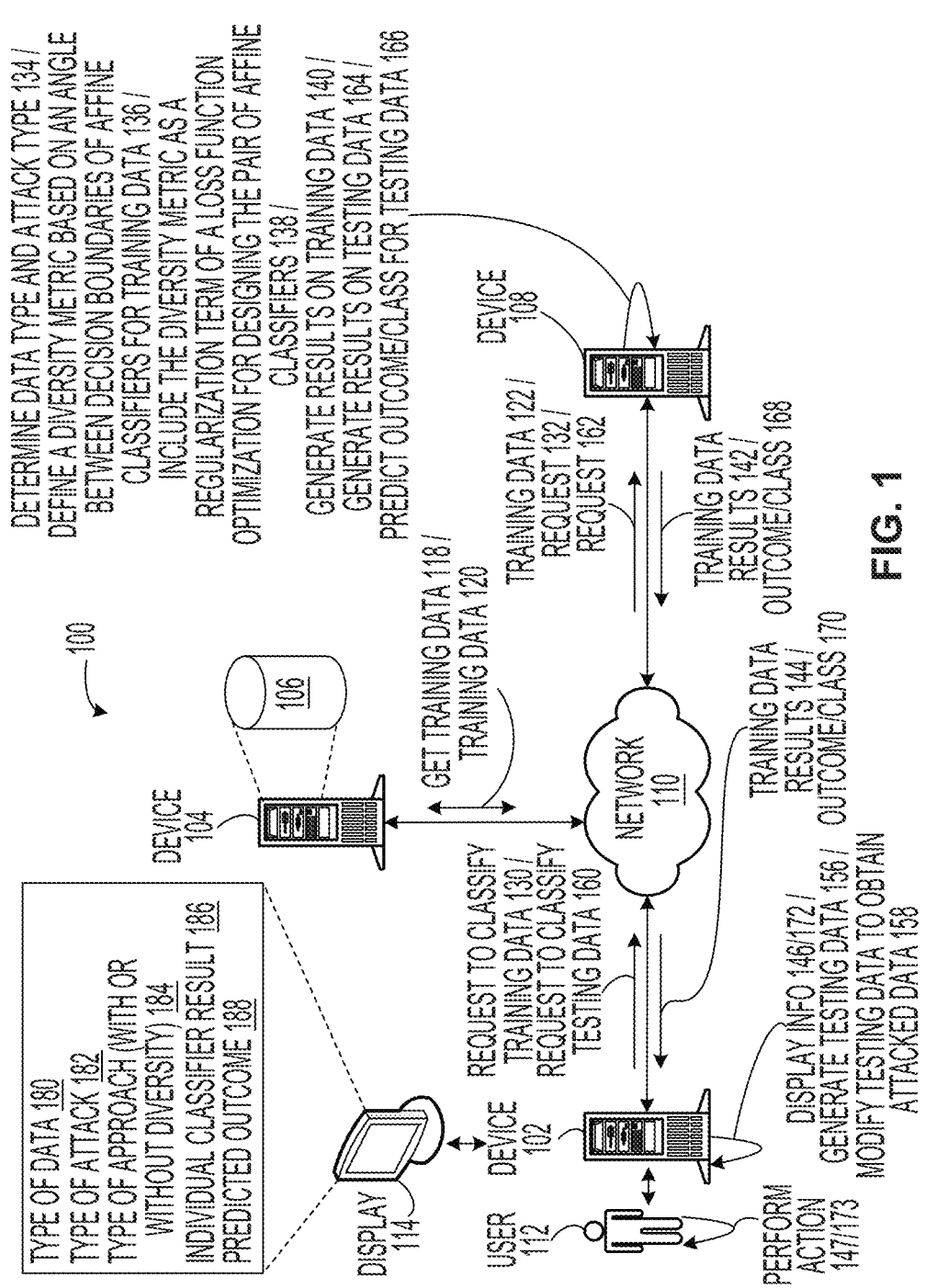

DETERMINE DATA TYPE AND ATTACK TYPE 134 /
DEFINE A DIVERSITY METRIC BASED ON AN ANGLE
BETWEEN DECISION BOUNDARIES OF AFFINE
CLASSIFIERS FOR TRAINING DATA 136 /
INCLUDE THE DIVERSITY METRIC AS A
REGULARIZATION TERM OF A LOSS FUNCTION
OPTIMIZATION FOR DESIGNING THE PAIR OF AFFINE
CLASSIFIERS 138 /
GENERATE RESULTS ON TRAINING DATA 140 /
GENERATE RESULTS ON TESTING DATA 164 /
PREDICT OUTCOME/CLASS FOR TESTING DATA 166

DEVICE 108

TRAINING DATA 122 /
REQUEST 132 /
REQUEST 162

TRAINING DATA
RESULTS 142 /
OUTCOME/CLASS 168

GET TRAINING DATA 118 /
TRAINING DATA 120

100

106

DEVICE 104

NETWORK 110

REQUEST TO CLASSIFY
TRAINING DATA 130 /
REQUEST TO CLASSIFY
TESTING DATA 160

TRAINING DATA
RESULTS 144 /
OUTCOME/CLASS 170

TYPE OF DATA 180
TYPE OF ATTACK 182
TYPE OF APPROACH (WITH OR
WITHOUT DIVERSITY) 184
INDIVIDUAL CLASSIFIER RESULT 186
PREDICTED OUTCOME 188

DISPLAY INFO 146/172 /
GENERATE TESTING DATA 156 /
MODIFY TESTING DATA TO OBTAIN
ATTACKED DATA 158

DISPLAY 114

DEVICE 102

USER 112

PERFORM
ACTION
147/173

METHOD AND SYSTEM FOR OPTIMIZING A PAIR OF AFFINE CLASSIFIERS BASED ON A DIVERSITY METRIC

RELATED APPLICATIONS

This application is related to:

U.S. application Ser. No. 17/158,631, entitled "System and Method for Reasoning About the Diversity and Robustness of an Ensemble of Classifiers," by inventors Shantanu Rane, Alejandro E. Brito, and Hamed Soroush, filed 26 Jan. 2021 (hereinafter "application Ser. No. 17/158,631");

U.S. application Ser. No. 17/345,996, entitled "Method and System for Creating an Ensemble of Machine Learning Models to Defend Against Adversarial Examples," by inventors Alejandro E. Brito, Bashir Sadeghi, and Shantanu Rane, filed 11 Jun. 2021 (hereinafter "application Ser. No. 17/345,996"); and U.S. application Ser. No. 17/400,016, entitled "Method and System for Learning an Ensemble of Neural Network Kernel Classifiers Based on Partitions of the Training Data," by inventors Alejandro E. Brito, Bashir Sadeghi, and Shantanu Rane, filed 11 Aug. 2021 (hereinafter "application Ser. No. 17/400,016"), the disclosures of which are herein incorporated by reference in their entirety.

BACKGROUND

Field

This disclosure is generally related to machine learning and data classification. More specifically, this disclosure is related to a method and system for optimizing a pair of affine classifiers based on a diversity metric.

Related Art

In the field of machine learning, adversarial examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. However, a principled analysis based on linear models remains a challenge.

SUMMARY

One embodiment provides a method and system which facilitates optimizing a pair of affine classifiers based on a diversity metric. During operation, the system defines a diversity metric based on an angle between decision boundaries of a pair of affine classifiers. The system includes the diversity metric as a regularization term in a loss function optimization for designing the pair of affine classifiers, wherein the designed pair of affine classifiers are mutually orthogonal. The system predicts an outcome for a testing data object based on the designed pair of mutually orthogonal affine classifiers.

In some embodiments, the angle between the decision boundaries is an angle between lines indicating the classifiers in two dimensions.

In some embodiments, the angle between the decision boundaries is an angle between hyperplanes in three or more dimensions.

In some embodiments, the diversity metric is further based on a function of the angle between the decision boundaries.

In some embodiments, the function includes at least one of: a cosine of the angle; a sine of the angle; and a function of the angle.

In some embodiments, the loss function optimization includes a loss term and the regularization term. Varying a coefficient of the regularization term can result in a lesser or a greater amount of influence of mutual orthogonality between the decision boundaries.

In some embodiments, the pair of classifiers becomes closer to mutually orthogonal as the value of the coefficient of the regularization term is increased.

In some embodiments, the pair of mutually orthogonal affine classifiers are robust against adversarial examples, and the predicted outcome based on the pair of mutually orthogonal affine classifiers is more accurate than a predicted outcome based on a pair of affine classifiers which are not mutually orthogonal.

In some embodiments, the system presents data to the pair of affine classifiers. The data presented to the pair of affine classifiers is an output of a kernel mapping, and a native space associated with the data is linearly separable (or capable of being linearly separable) into the kernel mapping.

In some embodiments, the kernel is a Gaussian kernel.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 1 presents an exemplary environment which facilitates optimizing a pair of affine classifiers based on a diversity metric, in accordance with an embodiment of the present application.

In the figures, like reference numerals refer to the same figure elements.

DETAILED DESCRIPTION

Figure 2:
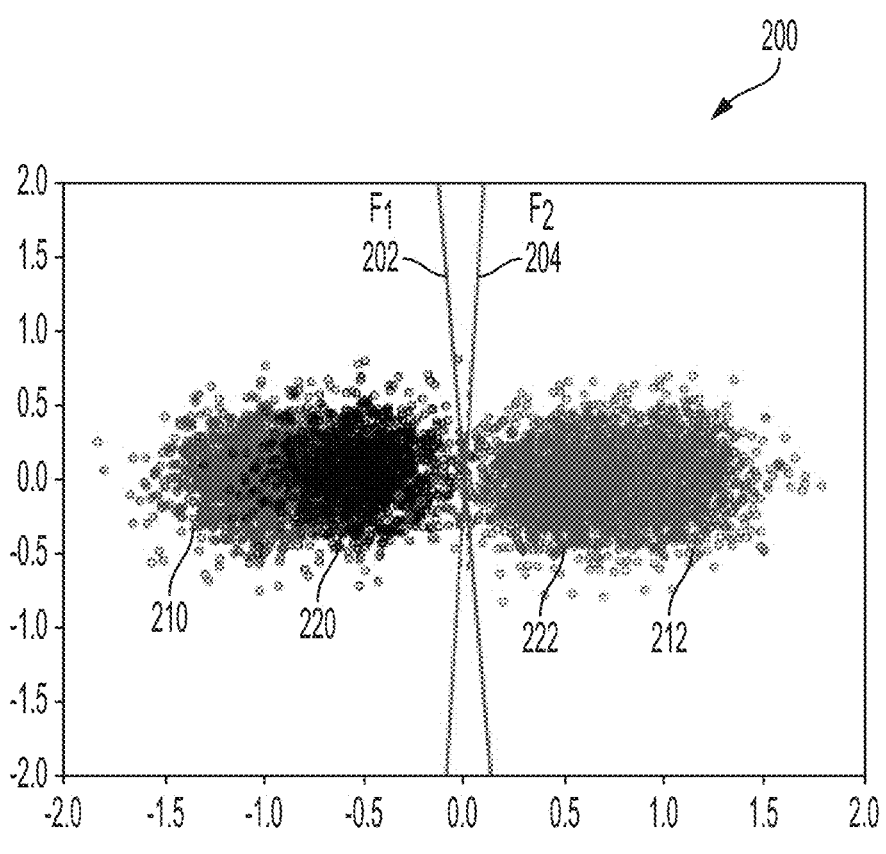
FIG. 2 presents a diagram illustrating decision boundaries of a pair of affine classifiers, with a regularization coefficient set to 0.05, and including clean data points and adversarial examples, in accordance with an embodiment of the present application.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Introduction and Overview

The embodiments described herein solve the problem of addressing perturbation-bounded evasion attacks by providing a system which optimizes a pair of affine classifiers based on a diversity metric.

As described above, adversarial machine learning examples can exploit the way that artificial intelligence algorithms work in order to disrupt the behavior of the algorithms. Recently, an increasing number and types of attacks have been devised in order to fool the algorithms, along with increasingly stronger defenses against such attacks. One large class of these attacks is "perturbation-bounded evasion attacks," which involve adversarial examples constructed by perturbing data samples with the goal of forcing a classifier to misclassify them. Such evasion attacks comprise a predominant class of attacks considered in current machine learning technology. One specific type of evasion attack involves adversarial examples which can be trivially classified by a human but can fool a machine learning classifier.

One solution to address these evasion attacks is to use an ensemble or collection of classifiers. For example, analyzing robustness against adversarial examples using linear models derived from convolutional neural networks (CNNs) is described in application Ser. No. 17/158,631. As another example, creating an ensemble of machine learning models to defend against adversarial examples is described in application Ser. No. 17/345,996. In another example, learning an ensemble of neural network classifiers by partitioning the training data randomly or by class is described in application Ser. No. 17/400,016.

However, these previous approaches do not provide a principled approach based on linear models. The embodiments described herein provide a system which addresses the above-described challenges by imposing diversity on the classifier itself and not based on, e.g., partitioning the training data as in application Ser. No. 17/400,016. The system can define a diversity metric based on an angle between decision boundaries of a pair of affine classifiers (i.e., two affine classifiers). These decision boundaries can be mutually orthogonal or close to mutually orthogonal (e.g., within a predetermined threshold of being mutually orthogonal). That is, the angle can be 90 degrees (perpendicular) or close to 90 degrees (nearly perpendicular). The system can include the diversity metric as a regularization term in a loss function optimization for designing the pair of affine classifiers.

Thus, the described embodiments provide a manner in which to design two classifiers which can optimally take advantage of their diversity such that classification may be robust against adversarial examples. This diversity can be achieved by incorporating a diversity optimization term into the loss function of the classifier. Example diagrams comparing a pair of non-diverse classifiers against a pair of diverse classifiers are described below in relation to FIGS. 2 and 3.

High-Level Overview

Given a two-class problem, e.g., panda and gibbon classes, consider an adversarial perturbation of a panda ("adversarial panda"). A first affine or linear classifier may incorrectly classify this adversarial panda as a gibbon. The optimal adversarial perturbation may be to perturb the original image of the panda and generate the adversarial panda by moving the original image in a perpendicular manner to the decision boundary of the first classifier. A second affine or linear classifier which is perpendicular to the first classifier would be unlikely to incorrectly classify the adversarial panda. The mutual orthogonality of the first classifier and the second classifier can thus result in the second classifier being robust to the adversarial perturbation which fooled the first classifier. Thus, the two mutually orthogonal affine classifiers can provide robust protection against adversarial manipulations which may address only one decision boundary.

Furthermore, as described below, an exactly mutual orthogonality may be less feasible or effective than a nearly mutual orthogonality. This "nearly mutual" (i.e., within a predetermined threshold of being exactly mutually perpendicular or orthogonal) concept can be defined by the diversity metric.

The system can frame a desired optimization problem to create two diverse classifiers based on a loss function and a regularization term (which can include the diversity metric), as described herein. The system can define the diversity metric based on an angle between decision boundaries of a pair of affine classifiers. The system can include the diversity metric as a regularization term in a loss function optimization for designing the pair of affine classifiers. The affine classifiers can be mutually or nearly mutually orthogonal. The system can subsequently predict an outcome, result, or classification for a testing data object based on the affine classifiers.

Exemplary Environment for Facilitating Optimizing a Pair of Affine Classifiers Based on a Diversity Metric FIG. 1 presents an exemplary environment 100 which facilitates optimizing a pair of affine classifiers based on a diversity metric, in accordance with an embodiment of the present application. Environment 100 can include: a device 102, an associated user 112, and an associated display screen 114; a device 104 and an associated or included storage device 106; and a device 108. Devices 102, 104, and 108 can communicate with each other via a network 110. Device 102 can be a client computing device, e.g., a laptop computer, a mobile telephone, a smartphone, a tablet, a desktop computer, and a handheld device. Devices 102, 104, and 108 can be a computing device, e.g., a server, a networked entity, and a communication device.

During operation, device 108 can request training data (as stored in storage device 106) from device 104, and device 104 can send training data to device 108 (via a get training data 118 communication and training data 120). Device 108 can receive training data 120 (as training data 122) and perform a series of operations to obtain a pair of affine classifiers which optimize a diversity metric to defend against adversarial examples. Upon receiving training data 122, device 108 can determine the data type and attack type (operation 134). Device 108 can also determine the data type and attack type in response to receiving a request to classify training data 130 from user 112 (via device 102), which request 130 can be received by device 108 as a request 132.

Device 108 can define a diversity metric based on an angle between decisions boundaries of a pair of affine classifiers for the training data (operation 136). Device 108 can include the defined diversity metric as a regularization term of a loss function optimization for designing the pair of affine classifiers, where the designed pair of affine classifiers are mutually orthogonal (operation 138).

Device 108 can generate the results on the training data (operation 140) based on the pair of obtained affine classifiers. Device 108 can send training data results to device 102 (as results 142). Device 102 can receive training data results 142 (as training data results 144) and can perform a display information 146 operation, which can cause to be displayed on display 114 at least: the type of data 180 (e.g., whether the data is clean or based on an adversarial attack); the type of attack 182 (if the data type is data under attack, e.g., a fast gradient method (FGM) or a projected gradient descent (PGD) attack); the type of approach used (e.g., with or without diversity) 184; and the result from an individual classifier 186. As an example, display 114 can include diagram 200 or 300, which is described below in relation to, respectively, FIGS. 2 and 3. The system can display any of this information on display 114, in any combination, which can allow user 112 to interact with display 114 to perform additional actions, such as sending a request to classify testing data, as described below.

User 112 can view the information displayed on display 114 and can perform an action 147. For example, user 112 can change a configuration or setting related to, e.g., the type of data (180), the type of attack (182), and the type of approach (184). While not depicted in FIG. 1, user 112 can also change a setting related to the regularization term. As another example, user 112 may interact with the information presented on display 114 to view detailed information about a specific classifier or set of results or classification result. In some embodiments, user 112 can select a classifier of the displayed pair of classifiers (e.g., to view more detailed information) and can also generate (via a user interface widget, not shown) and send a command to modify the classifier.

Furthermore, user 112, via device 102, can determine or generate testing data, including a testing data object (e.g., via an operation 156). The testing data (and the testing data object) can include data under attack, e.g., modified based on an adversarial technique. In some embodiments, device 102 (or user 112 via device 102) can modify or perturb the testing data to obtain attacked data (operation 158). Device 102 can send a corresponding request to classify the testing data (via a communication 160). Device 108 can receive the request to classify the testing data (as a request 162) and can generate results on the testing data (operation 164) or predict an outcome/class for the testing data (operation 166). Operations 164 and 166 can include running the previously obtained pair of affine classifiers on the testing data. Using the previously obtained pair of affine classifiers, which are mutually orthogonal based on the prior use of the diversity metric optimization described above, can result in increasing the robustness of the pair of affine classifiers, which in turn can result in an increased accuracy for classification.

Device 108 can send a predicted outcome/class 168 to device 102. Device 102 can received predicted outcome/class 168 (as outcome/class 170) and can perform a display information 172 operation, which can cause certain information to be displayed on display 114, as described above in relation to operation 146. The information displayed on display 114 can further include a predicted outcome 188. Display 114 can also include, e.g., diagrams similar to those described below in relation to FIGS. 2 and 3.

User 112 can perform an action 173, which can be similar to action 147 as described above, e.g., changing a setting, interacting with displayed information, selecting a classifier, and generating a command to update the predicted outcome based on different testing data.

Principled Diversity Metric for Optimizing a Pair of Affine Classifiers

The described embodiments can optimize the selection of a pair of affine classifiers in order to achieve robustness to adversarial examples. This optimization can be driven by the diversity metric, which can quantify how different the affine classifiers are from each other. If the classifiers are not diverse, their performance under adversarial perturbation may be similar. In contrast, classifiers which are diverse can exhibit adversarial robustness to different adversarial examples. As a result, generating and using a diverse pair of affine classifiers can provide increased overall robustness in a machine learning and data classification system.

Beginning with the simple case of multi-class affine classifiers, let $F_1(\cdot)+b_1$ and $F_2(\cdot)+b_2$ be two c-class affine classifiers on $\mathbb{R}^d$ ($F_i \in \mathbb{R}^{c \times d}$, $i=1, 2$, where F1 and F2 contain the weights and b1 and b2 are biases taken from the origin. For an arbitrary input data $x_1 \in \mathbb{R}^d$, the most effective adversarial perturbation for $\{F_1, b_1\}$ can be:

$$\sigma_1 = F_1^\dagger F_1 \alpha_1 \big(x_1 + F_1^\dagger(b_1 - y_1)\big) = \underbrace{F_1^\dagger F_1}_{P_{N(\mathcal{F}_1)^\perp}} z_1 \qquad \text{Eq. (1)}$$

$$\text{where } \alpha_1 = \frac{\epsilon}{\left\| F_1^\dagger \big(F_1 x_1 + P_{\mathcal{F}_1}(b_1 - y_1)\big) \right\|}.$$

Equation (1) is similar to the adversarial perturbation derived in S. M. Moosavi-Dezfooli et al., "DeepFool: a simple and accurate method to fool deep neural networks," in *Proceedings of the IEEE Conference on Computer Vision and Pattern Recognition* (22016), 2574-2582. Equation (1) can describe how to compute the adversarial perturbation for fooling a first model or classifier. A goal is to find a perturbation $\sigma_1$ which is orthogonal to the first model or classifier, e.g., the line determined by $\{F_1, b_1\}$. That is, if $\sigma^1$ moves a data point across $F_1$, then $F_2$ should be parallel to $\sigma_1$, or, if $\sigma_1$ is added to $x_1$, the result should be the same as if nothing is added to $x_1$. Thus, let $\{F_2, b_2\}$ be called absolutely robust to perturbation $\sigma_1$ if it holds that $$F_2(x_1+\sigma_1)+b_2 = F_2 x_1 + b_2$$

or equivalently $$F_2 \sigma_1 = F_2 {}^{P} \mathcal{N}(F_1)^{\perp} z_1 = 0 \qquad \text{Eq. (2)}$$

where ${}^{P} \mathcal{N}(F_1)^{\perp}$ is the projection matrix corresponding to the orthogonal complement of the null space of $F_1$, and the perturbation $\sigma_1$ is in the null space of $F_2$. In other words, all perturbations in the null space of $F_2$ will not affect the accuracy of the classification result of $F_2$, and $F_2$ is thus immune to adversarial perturbations of that type.

Because $x_1$ is chosen arbitrarily from Eq. (1), $z_1$ can be any direction in $\mathbb{R}^d$ and thus $$F_2 {}^{P} \mathcal{N}(F_1)^{\perp} = 0$$

or equivalently $$\mathcal{N}(F_1)^{\perp} = \mathcal{R}(F_1^T) \subseteq \mathcal{N}(F_2)$$

where $\mathcal{R}(F_1^T)$ is the range space of $F_1^T$, and $\mathcal{N}(F_2)$ is the null space of $F_2$. This is equivalent to the following orthogonality condition:

$$\langle F_1, F_2 \rangle = \langle F_1^T, F_2^T \rangle = Tr[F_2 F_1^T] = 0 \Leftrightarrow F_1 \perp F_2 \qquad \text{Eq. (3)}$$

Consider the following as a starting point in the development of a metric for pairwise diversity between $F_2$ from $F_1$:

$$\|F_2(x_1 + \sigma_1) + b_2 - F_2 x_1 - b_2\|^2 = \|F_2 \sigma_1\|^2.$$

In theory, it may be desirable to have $F_2 \sigma_1$ be equal to zero. However, in practice, using a value of zero for the diversity metric may reduce the performance of an actual second classifier (or other classifiers). This is because while an exactly perpendicular second classifier be effective for perturbed data, such an exactly perpendicular second classifier may not be effective for normal data. Thus, the described embodiments consider the tradeoff of the classification ability, effectiveness, and accuracy of the second classifier(s) versus its robustness to adversarial examples. Furthermore, the described embodiments may use classifiers which are pairwise nearly or close to mutually orthogonal, e.g., within a predetermined threshold of being mutually orthogonal.

The diversity metric can be denoted by $D(F_2; F_1)$ and defined as:

$$D(F_2; F_1) = \|F_2 \sigma_1\|^2 = \|F_2 {}^{P} \mathcal{N}(F_1)^{\perp} z_1\|^2$$

As a result, the following holds:

$$s_{min}^2(F_2 {}^{P} \mathcal{N}(F_1)^{\perp})\|z_1\|^2 \leq \|F_2 \sigma_1\|^2 \leq s_{max}^2(F_2 {}^{P} \mathcal{N}(F_1)^{\perp})\|z_1\|^2$$

where $s_{min}$ and $s_{max}$ are the minimum and maximum singular values of $F_2$. In order to use the entire spectrum, a good choice for $D(F_2; F_1)$ can be $$D(F_2; F_1) = \sum_{k=1}^{c} s_k^2 (F_2 P_{\mathcal{N}(\mathcal{F}_1)^{\perp}})$$

$$= Tr\left[F_2^T F_2 P_{\mathcal{N}(F_1)^{\perp}}\right]$$

$$\langle F_2^T F_2, P_{\mathcal{N}(F_1)^{\perp}} \rangle.$$

Thus, the diversity metric $D(F_2; F_1)$ can be proportional to $$\text{angle}(\mathcal{N}(F_2)^{\perp}, \mathcal{N}(F_1)^{\perp})$$

$$= \text{angle}(\mathcal{R}(F_2^T), \mathcal{R}(F_1^T))$$

$$\approx \text{angle}(F_2^T, F_1^T).$$

An alternative definition of the diversity metric $D(F_2; F_1)$ can be:

$$D(F_2; F_1) = \frac{|\langle F_1, F_2 \rangle|}{\|F_2\|\|F_1\|} \qquad \text{Eq. (4)}$$

This diversity metric as defined in Equation (4) and above can be used in the cost function of an optimization problem designed to yield a diverse ensemble of classifiers. For a two-classifier ensemble, this optimization problem can have a cost function which is composed of the loss functions incurred by each classifier and the pairwise diversity metric, as shown in the following equation:

$$\min_{F_1, b_1, F_2, b_2} \sum_{k=1}^{n} \{L_1(x_k, y_k) + L_2(x_k, y_k)\} + \lambda D(F_2; F_1) = \qquad \text{Eq. (5)}$$

$$\min_{F_1, b_1, F_2, b_2} \sum_{k=1}^{n} \{F_1 x_k + b_1 - y_k + F_2 x_k + b_2 - y_k\} + \lambda D(F_2; F_1)$$

The diversity optimization formulation of Equation (5) can ensure that a pair of affine classifiers become closer and closer to pairwise orthogonal as the value of the regularization parameter $\lambda$ is increased. This can ensure that when an adversarial perturbation moves a sample across a decision boundary of any given classifier, that movement is parallel to the decision boundary of the other classifier, which can prevent misclassification by the other classifier.

Furthermore, Equation (5) illustrates that each classifier of the pair of classifiers is aware of the other classifier of the pair, and, based on the regularization term which includes the diversity metric $D(F_2; F_1)$, each classifier has an understanding of its geometric placement relative to the other classifier (e.g., mutually orthogonal). In other words, including the diversity metric $D(F_2; F_1)$ in the loss function optimization can force $F_1$ and $F_2$ to become closer to orthogonal. Indeed, as the coefficient $\lambda$ of the regularization term is increased, it can have a greater amount of influence on the mutual orthogonality between the decision boundaries of the pair of classifiers. As the coefficient $\lambda$ of the regularization term is decreased (or even set to zero, as in the design of a conventional classifier to minimize losses), it can exert less or no control over how $F_1$ and $F_2$ behave relative to each other.

Concrete Results

The following examples provide the results of implementing the diversity-based optimization process for a pair of affine classifiers, as described above in relation to Equation (5) and FIG. 1. Assume that the examples are generated based on synthetic data. The classes can be composed of two-dimensional (2D) Gaussian distributed samples with means located at (−1, 0) and (+1, 0). The results can be shown as described below in relation to FIGS. 2 and 3, with different values for the regularization coefficient $\lambda$.

FIG. 2 presents a diagram 200 illustrating decision boundaries of a pair of affine classifiers, with a regularization coefficient set to 0.05, and including clean data points and adversarial examples, in accordance with an embodiment of the present application. In diagram 200, the regularization coefficient $\lambda$ is set to 0.05, which can result in the pair of classifiers providing a low diversity. The blue line indicates a first classifier $F_1$ 202 and the green line indicates a second classifier $F_2$ 204. Blue points or point clouds 210 and red points or point clouds 212 can indicate clean data. Black points or point clouds 220 and green points or point clouds 222 can indicate adversarial examples generated from the blue and red points or point clouds respectively.

An attack carried out on the blue decision boundary $F_1$ can also fool the green decision boundary $F_2$, as indicated by the black points 220 which fool both blue decision boundary $F_1$ and green decision boundary $F_2$.

Figure 3:
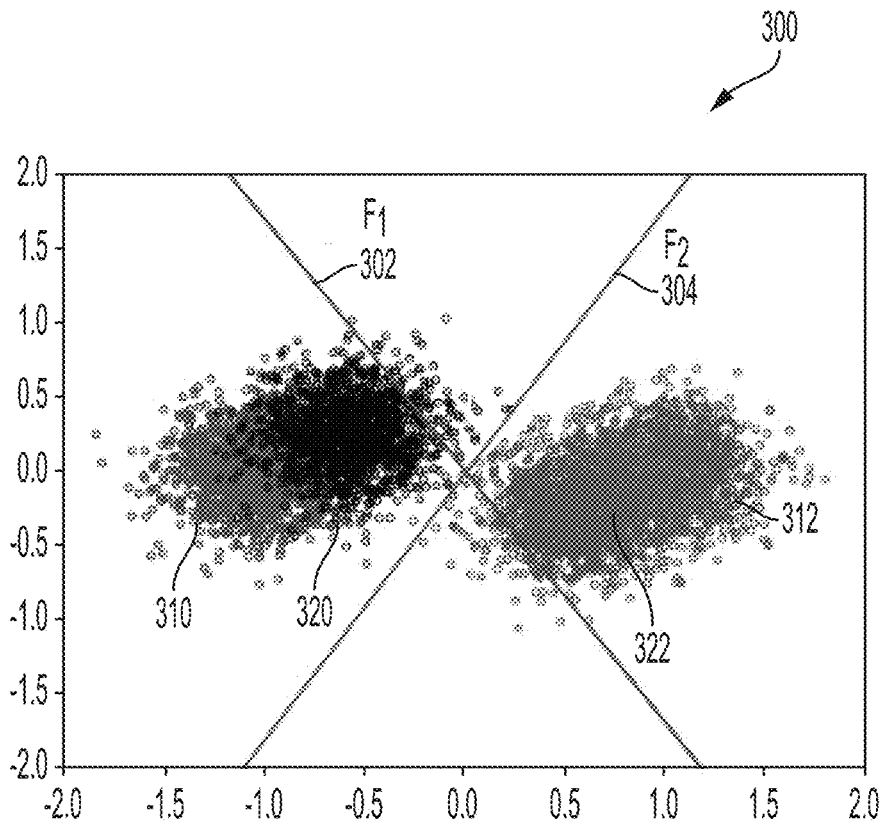
FIG. 3 presents a diagram illustrating decision boundaries of a pair of affine classifiers, with a regularization coefficient set to 0.1, and including clean data points and adversarial examples, in accordance with an embodiment of the present application.

FIG. 3 presents a diagram 300 illustrating decision boundaries of a pair of affine classifiers, with a regularization coefficient set to 0.1, and including clean data points and adversarial examples, in accordance with an embodiment of the present application. In diagram 300, the regularization coefficient λ is set to 0.1, which can result in the pair of classifiers providing a higher diversity than that depicted in FIG. 2. As in FIG. 2, the blue line indicates a first classifier $F_1$ 302 and the green line indicates a second classifier $F_2$ 304. Blue points or point clouds 310 and red points or point clouds 312 can indicate clean data. Black points or point clouds 320 and green points or point clouds 322 can indicate adversarial examples generated from the blue and red points or point clouds respectively.

An attack carried out on the blue decision boundary $F_1$ can cause the adversarial examples (e.g., black points 320 and green points 322) to move almost parallel to green decision boundary $F_2$ 304, which indicates that green decision boundary $F_2$ 304 is significantly more robust to adversarial examples (e.g., black points 320 and green points 322) that fool blue decision boundary $F_1$ 302.

Thus, FIGS. 2 and 3 depict the advantage and improvement in classification and robustness to adversarial examples, over using two classifiers which are non-diverse (as in FIG. 2), of two classifiers which are diverse and optimized to be mutually orthogonal based on including the diversity metric as a regularization term in the loss function optimization (as in FIG. 3).

Figure 4:
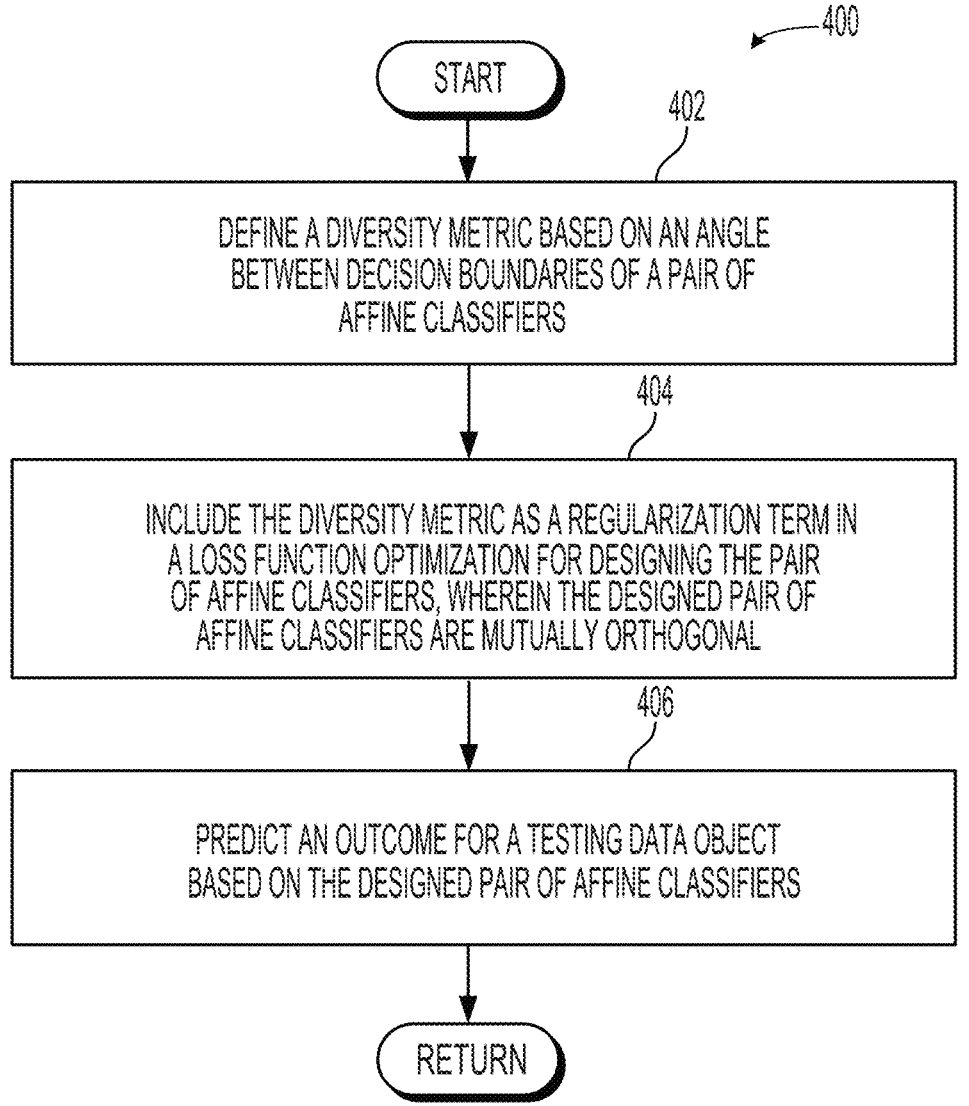
FIG. 4 presents a flowchart illustrating a method which facilitates optimizing a pair of affine classifiers based on a diversity metric, in accordance with an embodiment of the present application.

Method for Facilitating Construction of an Ensemble of Neural Network-Based Classifiers that Optimize a Diversity Metric FIG. 4 presents a flowchart 400 illustrating a method which facilitates optimizing a pair of affine classifiers based on a diversity metric, in accordance with an embodiment of the present application. During operation, the system defines a diversity metric based on an angle between decision boundaries of a pair of affine classifiers (operation 402). The system includes the diversity metric as a regularization term in a loss function optimization for designing the pair of affine classifiers, wherein the designed pair of affine classifiers are mutually orthogonal (operation 404). The system predicts an outcome for a testing data object based on the designed pair of affine classifiers (operation 406). The operations depicted in flowchart 400 can result in a pair of affine classifiers which are optimally designed based on a diversity metric (e.g., based on the affine classifiers being mutually or nearly mutually orthogonal). Furthermore, the optimally designed affine classifiers may be more robust to adversarial examples than other affine classifiers which are not based on the diversity metric described herein (i.e., not mutually or close to mutually orthogonal), as shown above in diagrams 200 and 300 of FIGS. 2 and 3.

Integration into a Practical Application and Improvements to Technologies

The embodiments described herein can be integrated into a practical application for, and can result in an improvement in, several technologies and technical fields, including but not limited to: artificial intelligence; machine learning and analytics; data mining (including of a significant volume of data); data classification; and defense against adversarial attacks and adversarial examples, including perturbation-bounded evasion attacks.

Users of the system described herein can include an individual with a smartphone, a mobile device, or a computing terminal (e.g., user 112 of environment 100 of FIG. 1). Users of the system can also include any client in a machine learning or an artificial intelligence setting, where increasing the effectiveness of classifiers against adversarial attacks using the described diversity optimization can result in an increase in the accuracy of classification of test data or a testing data object. For example, the diagrams described above in relation to FIGS. 2 and 3 support the technological improvements of the described embodiments because the pair of diverse classifiers (which observe the orthogonality condition) can provide a more robust defense against adversarial perturbations as compared to the pair of non-diverse classifiers.

Furthermore, the described embodiments provide an improvement to technology because the system allows a user to interact with the obtained pair of affine classifiers and resulting classifications (as shown in the exemplary information displayed in display 114 of FIG. 1). The system can result in more efficiently training the machine learning models against adversarial examples, which can result both in an improved model and a more efficient overall user experience.

Exemplary Computer System and Apparatus

Figure 5:
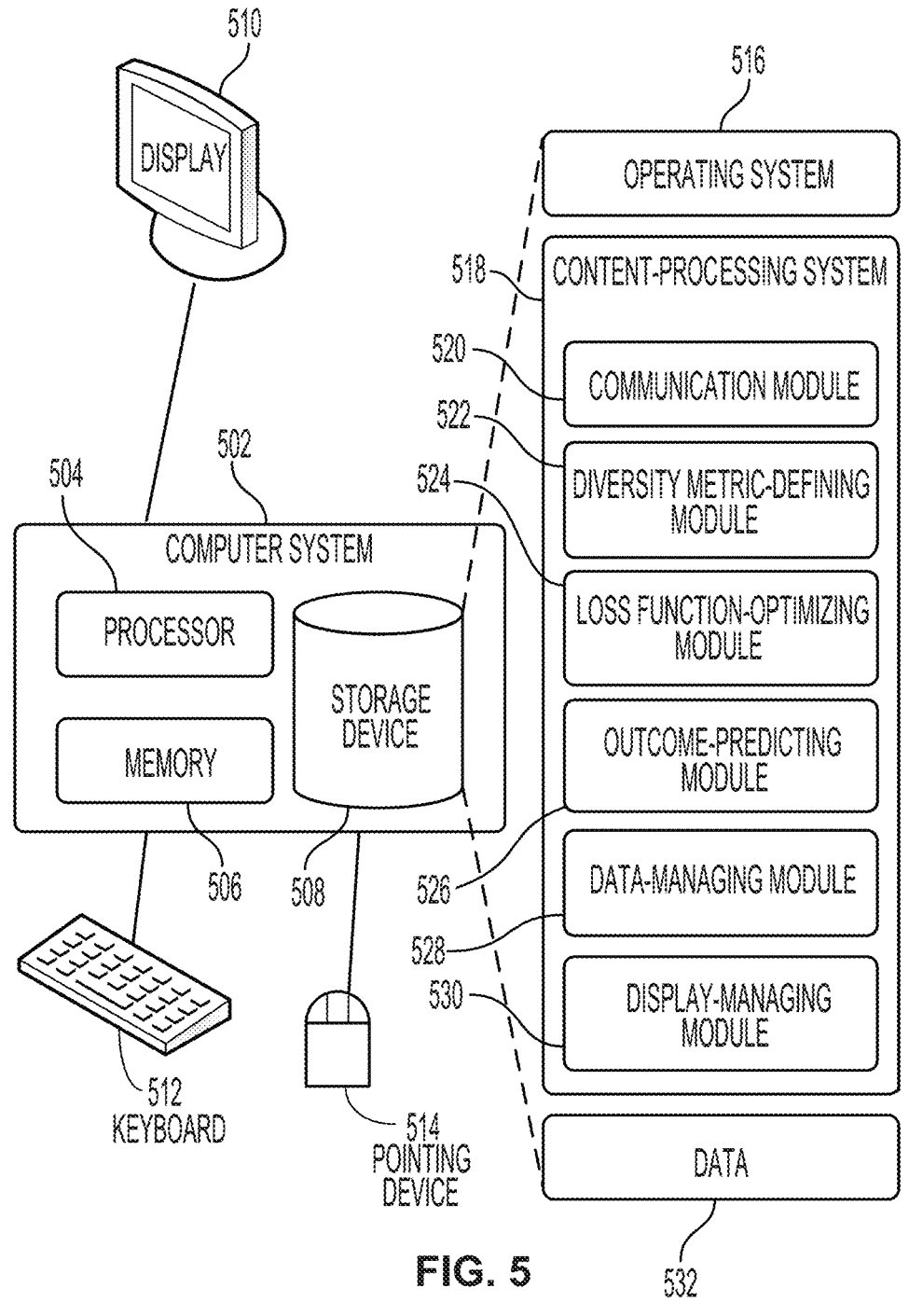
FIG. 5 presents an exemplary computer and communication system which facilitates optimizing a pair of affine classifiers based on a diversity metric, in accordance with an embodiment of the present application.

FIG. 5 presents an exemplary computer and communication system 502 which facilitates optimizing a pair of affine classifiers based on a diversity metric, in accordance with an embodiment of the present application. Computer system 502 includes a processor 504, a memory 506, and a storage device 508. Memory 506 can include a volatile memory (e.g., RAM) that serves as a managed memory, and can be used to store one or more memory pools. Furthermore, computer system 502 can be coupled to a display device 510, a keyboard 512, and a pointing device 514. Storage device 508 can store an operating system 516, a content-processing system 518, and data 534.

Content-processing system 518 can include instructions, which when executed by computer system 502, can cause computer system 502 to perform methods and/or processes described in this disclosure. Specifically, content-processing system 518 may include instructions for sending and/or receiving data packets to/from other network nodes across a computer network (communication module 520). A data packet can include data, a request, a command, a model, a classifier, training data, test data, a testing data object, a result, and an outcome.

Content-processing system 518 can further include instructions for defining a diversity metric based on an angle between decision boundaries of a pair of affine classifiers (diversity metric-defining module 522). Content-processing system 518 can include instructions for including the diversity metric as a regularization term in a loss function optimization for designing the pair of affine classifiers, wherein the designed pair of affine classifiers are mutually orthogonal (loss function-optimizing module 524). Content-processing system 518 can include instructions for predicting an outcome for a testing data object based on the designed pair of affine classifiers (outcome-predicting module 526).

Content-processing system 518 can also include instructions for retrieving or obtaining training or testing data (data-managing module 528). Content-processing system 518 can include instructions for displaying information on display 510 or on a display associated with a user or computing device which is in communication with computer system 502 (display-managing module 530). Exemplary displayed information is described above in relation to, e.g., display 114 and operations 146, 147, 172, and 173 of FIG. 1. Content-processing system 518 can additionally include instructions for allowing a user to interact with the displayed information (display-managing module 530).

Data 532 can include any data that is required as input or that is generated as output by the methods and/or processes described in this disclosure. Specifically, data 532 can store at least: data; a set of data; a training data object; training data; test or testing data; a testing data object; an image; a perturbed image or data object; data which has been modified based on a perturbation-bounded evasion attack; a parameter; a regularization term; a coefficient; a loss function; an optimization of a loss function; a request; a command; a classifier; an affine classifier; a diversity metric; a decision boundary; an angle; a kernel; a Gaussian kernel; an input; an output; a label; an outcome; a result; a predicted outcome or result; a classification; a type of attack; a type of data; a type of approach; a type of classifier; and a result from an individual classifier.

Figure 6:
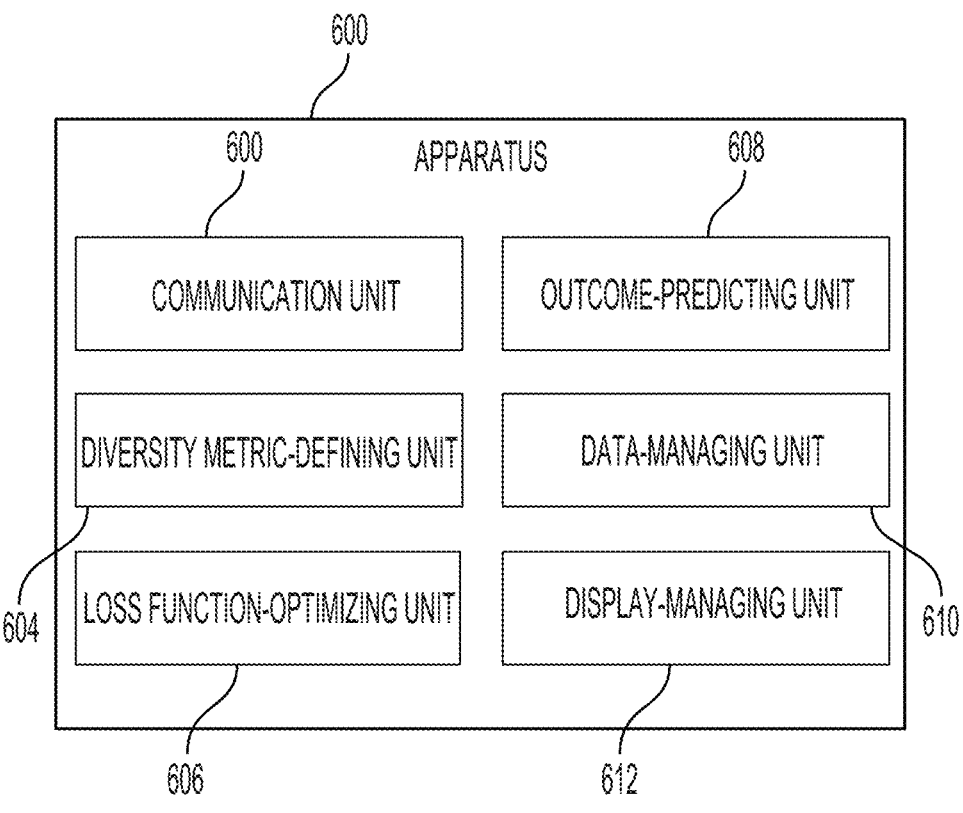
FIG. 6 presents an exemplary apparatus which facilitates optimizing a pair of affine classifiers based on a diversity metric, in accordance with an embodiment of the present application.

FIG. 6 presents an exemplary apparatus 600 which facilitates optimizing a pair of affine classifiers based on a diversity metric, in accordance with an embodiment of the present application. Apparatus 600 can comprise a plurality of units or apparatuses which may communicate with one another via a wired, wireless, quantum light, or electrical communication channel. Apparatus 600 may be realized using one or more integrated circuits, and may include fewer or more units or apparatuses than those shown in FIG. 6. Further, apparatus 600 may be integrated in a computer system, or realized as a separate device or devices capable of communicating with other computer systems and/or devices. Specifically, apparatus 600 can comprise units 602-612 which perform functions or operations similar to modules 520-530 of computer system 502 of FIG. 5, including: a communication unit 602; a diversity metric-defining unit 604; a loss function-optimizing unit 606; an outcome-predicting unit 608; a data-managing unit 610; and a display-managing unit 612.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described above can be included in hardware modules or apparatus. The hardware modules or apparatus can include, but are not limited to, application-specific integrated circuit (ASIC) chips, field-programmable gate arrays (FPGAs), dedicated or shared processors that execute a particular software module or a piece of code at a particular time, and other programmable-logic devices now known or later developed. When the hardware modules or apparatus are activated, they perform the methods and processes included within them.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executable method, comprising:

determining data objects, wherein a data object comprises a training data object or a testing data object;

defining a diversity metric based on an angle between decision boundaries of a pair of affine classifiers;

including the diversity metric as a regularization term in a loss function optimization for designing the pair of affine classifiers, wherein the designed pair of affine classifiers are mutually orthogonal;

predicting an outcome or class associated with a respective data object based on the designed pair of affine classifiers;

displaying, on a device associated with a user, information related to the predicted outcome or class associated with the respective data object, wherein the information comprises one or more of:

a type of the respective data object, including whether the respective data object is clean or modified based on an adversarial attack;

a type associated with the adversarial attack, in response to the respective data object being modified based on an adversarial attack;

an approach associated with the respective data object, including whether the respective data object is associated with diversity; and a result based on a respective classifier of the pair of affine classifiers;

receiving, based on an interaction by the user with the displayed information, a request to change a configuration or setting related to one or more of the type of the respective data object, the type associated with an adversarial attack, the approach associated with the respective data object, the regularization term, and a selected classifier of the pair of affine classifiers;

predicting an updated outcome or class associated with the respective data object based on the changed configuration or setting, wherein the respective data object comprises attacked data modified based on an adversarial technique; and displaying, on the device associated with the user, the information related to the predicted updated outcome or class associated with the respective data object.

13

14

2. The method of claim 1,
wherein the angle between the decision boundaries is an angle between lines indicating the classifiers in two dimensions.

3. The method of claim 1,
wherein the angle between the decision boundaries is an angle between hyperplanes in three or more dimensions.

4. The method of claim 1,
wherein the diversity metric is further based on a function of the angle between the decision boundaries.

5. The method of claim 4, wherein the function includes at least one of:
a cosine of the angle;
a sine of the angle; and
a function of the angle.

6. The method of claim 1,
wherein the loss function optimization includes a loss term and the regularization term, and
wherein varying a coefficient of the regularization term can result in a lesser or a greater amount of influence of mutual orthogonality between the decision boundaries.

7. The method of claim 1,
wherein the pair of affine classifiers becomes closer to mutually orthogonal as the value of the coefficient of the regularization term is increased.

8. The method of claim 1,
wherein the pair of mutually orthogonal affine classifiers are robust against adversarial examples, and
wherein the predicted outcome based on the pair of mutually orthogonal affine classifiers is more accurate than a predicted outcome based on a pair of affine classifiers which are not mutually orthogonal.

9. The method of claim 1, further comprising:
presenting data to the pair of affine classifiers,
wherein the data presented to the pair of affine classifiers is an output of a kernel mapping, and
wherein a native space associated with the data is linearly separable into the kernel mapping.

10. The method of claim 9,
wherein the kernel is a Gaussian kernel.

11. A computer system for facilitating data classification, the computer system comprising:
a processor; and
a storage device storing instructions that when executed by the processor cause the processor to perform a method, the method comprising:
determining data objects, wherein a data object comprises a training data object or a testing data object;
defining a diversity metric based on an angle between decision boundaries of a pair of affine classifiers;
including the diversity metric as a regularization term in a loss function optimization for designing the pair of affine classifiers, wherein the designed pair of affine classifiers are mutually orthogonal;
predicting an outcome or class associated with a respective data object based on the designed pair of mutually orthogonal affine classifiers;
displaying, on a device associated with a user, information related to the predicted outcome or class associated with the respective data object, wherein the information comprises one or more of:
a type of the respective data object, including whether the respective data object is clean or modified based on an adversarial attack;

a type associated with the adversarial attack, in response to the respective data object being modified based on an adversarial attack;
an approach associated with the respective data object, including whether the respective data object is associated with diversity; and
a result based on a respective classifier of the pair of affine classifiers;
receiving, based on an interaction by the user with the displayed information, a request to change a configuration or setting related to one or more of the type of the respective data object, the type associated with an adversarial attack, the approach associated with the respective data object, the regularization term, and a selected classifier of the pair of affine classifiers;
predicting an updated outcome or class associated with the respective data object based on the changed configuration or setting, wherein the respective data object comprises attacked data modified based on an adversarial technique; and
displaying, on the device associated with the user, the information related to the predicted updated outcome or class associated with the respective data object.

12. The computer system of claim 11,
wherein the angle between the decision boundaries is an angle between liens indicating the classifiers in two dimensions.

13. The computer system of claim 11,
wherein the angle between the decision boundaries is an angle between hyperplanes in three or more dimensions.

14. The computer system of claim 11,
wherein the diversity metric is further based on a function of the angle between the decision boundaries.

15. The computer system of claim 14, wherein the function includes at least one of:
a cosine of the angle;
a sine of the angle; and
a function of the angle.

16. The computer system of claim 11,
wherein the loss function optimization includes a loss term and the regularization term, and
wherein varying a coefficient of the regularization term can result in a lesser or a greater amount of influence of mutual orthogonality between the decision boundaries.

17. The computer system of claim 11,
wherein the pair of mutually orthogonal affine classifiers are robust against adversarial examples, and
wherein the predicted outcome based on the pair of mutually orthogonal affine classifiers is more accurate than a predicted outcome based on a pair of affine classifiers which are not mutually orthogonal.

18. The computer system of claim 11, wherein the method further comprises:
presenting data to the pair of affine classifiers,
wherein the data presented to the pair of affine classifiers is an output of a kernel mapping, and
wherein a native space associated with the data is linearly separable into the kernel mapping.

19. A non-transitory computer-readable storage medium storing instructions that when executed by a computer cause the computer to perform a method, the method comprising:
determining data objects, wherein a data object comprises a training data object or a testing data object;
defining a diversity metric based on an angle between decision boundaries of a pair of affine classifiers;

including the diversity metric as a regularization term in a loss function optimization for designing the pair of affine classifiers, wherein the designed pair of affine classifiers are mutually orthogonal;

predicting an outcome or class associated with a respective data object based on the designed pair of mutually orthogonal affine classifiers;

displaying, on a device associated with a user, information related to the predicted outcome or class associated with the respective data object, wherein the information comprises one or more of:

a type of the respective data object, including whether the respective data object is clean or modified based on an adversarial attack;

a type associated with the adversarial attack, in response to the respective data object being modified based on an adversarial attack;

an approach associated with the respective data object, including whether the respective data object is associated with diversity; and a result based on a respective classifier of the pair of affine classifiers;

receiving, based on an interaction by the user with the displayed information, a request to change a configuration or setting related to one or more of the type of the respective data object, the type associated with an adversarial attack, the approach associated with the respective data object, the regularization term, and a selected classifier of the pair of affine classifiers;

predicting an updated outcome or class associated with the respective data object based on the changed configuration or setting, wherein the respective data object comprises attacked data modified based on an adversarial technique; and displaying, on the device associated with the user, the information related to the predicted updated outcome or class associated with the respective data object.

20. The non-transitory storage medium of claim 19, wherein the angle between the decision boundaries comprises at least one of:

an angle between lines indicating the classifiers in two dimensions; and an angle between hyperplanes in three or more dimensions.

* * * * *